Patented Sept. 12, 1922.

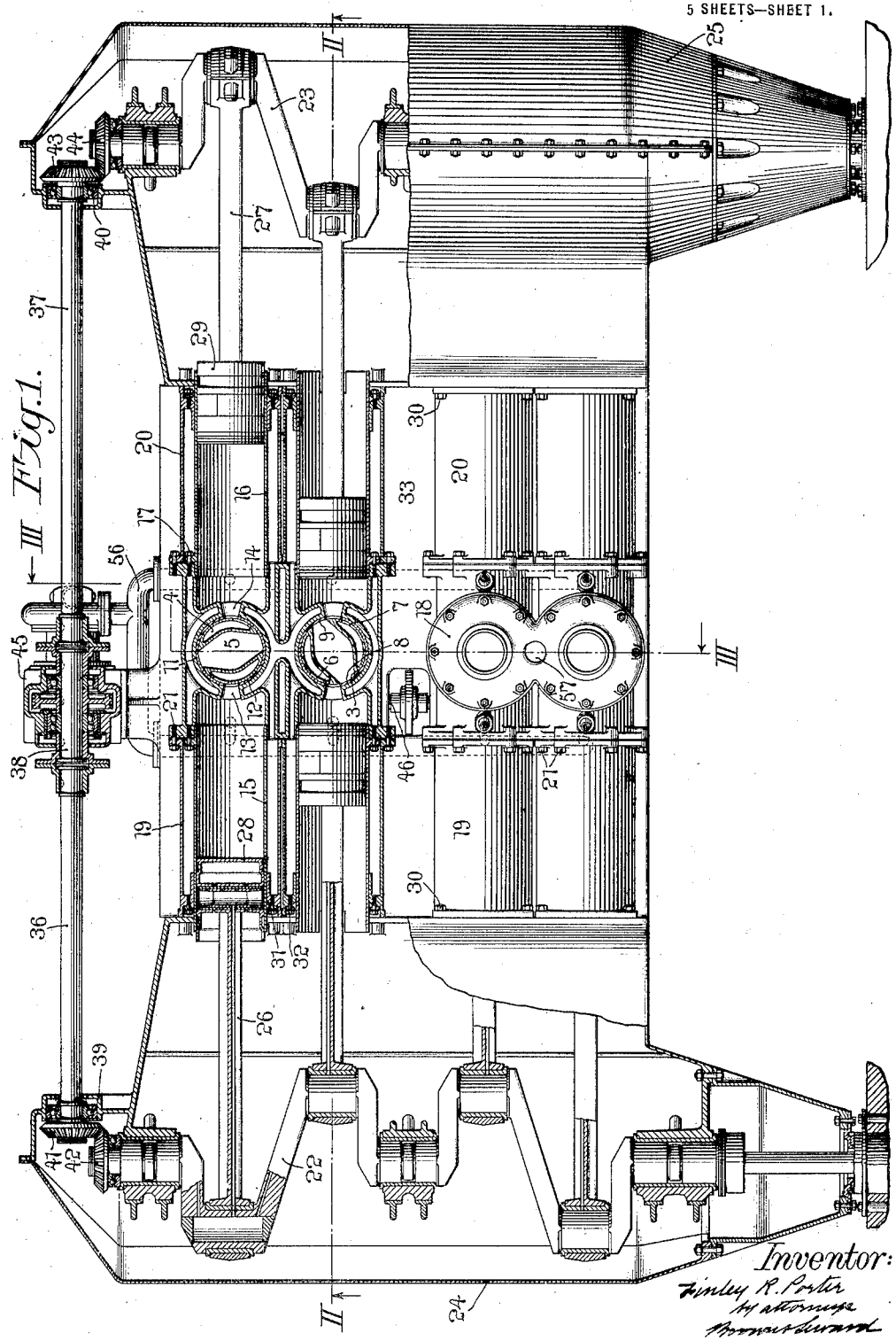

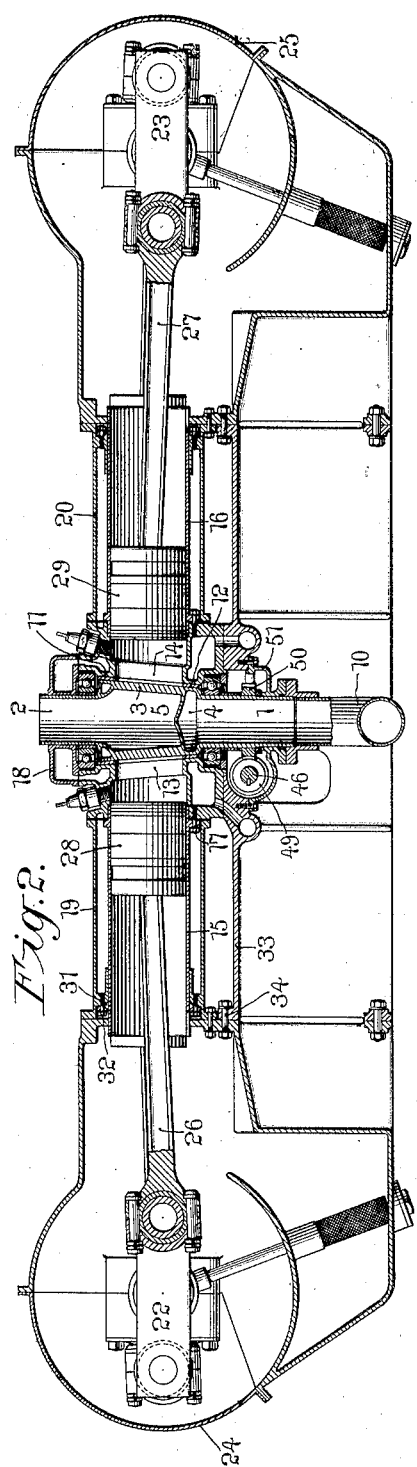

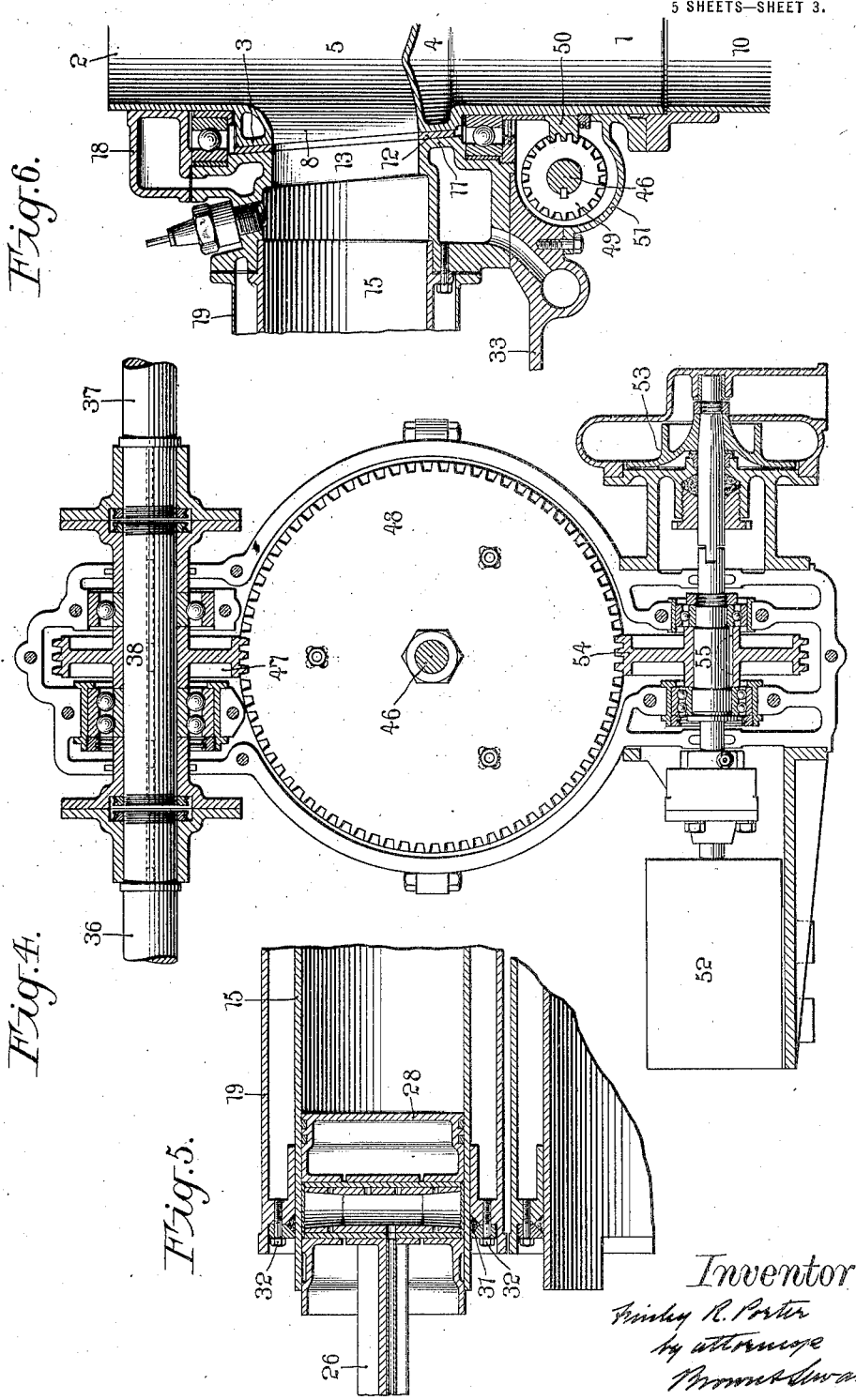

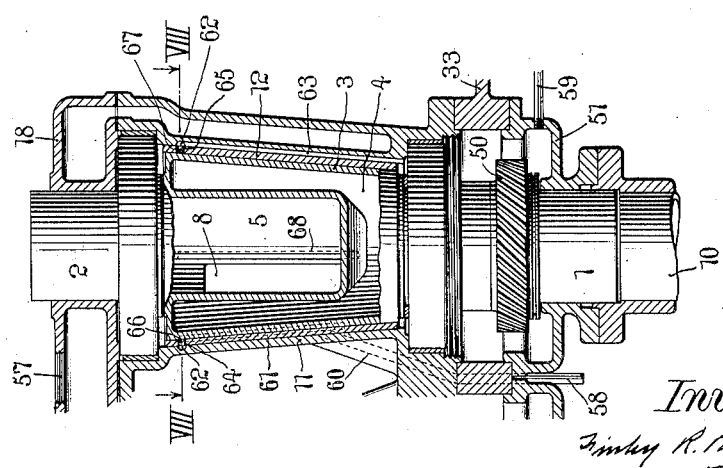

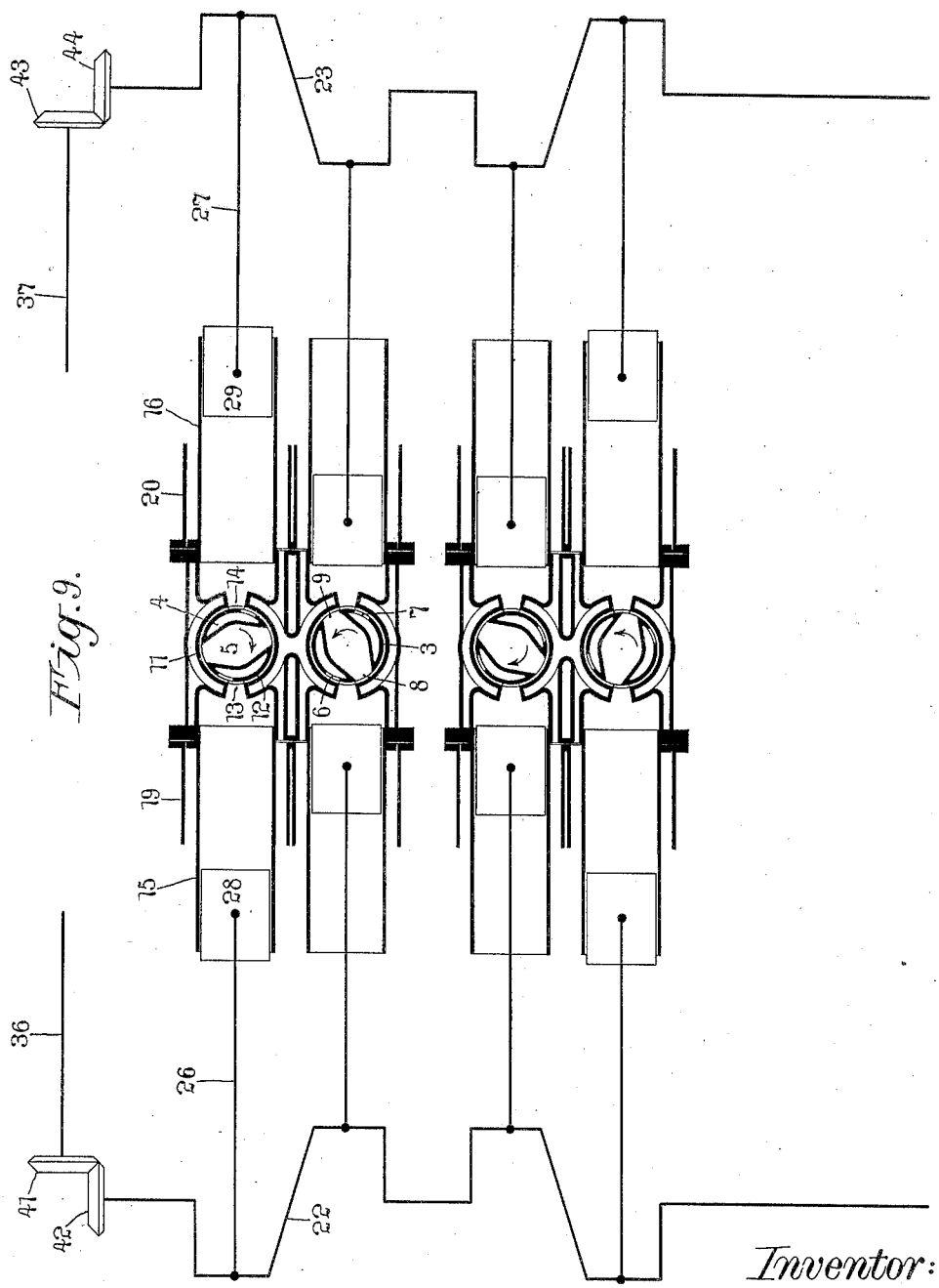

1,428,858

UNITED STATES PATENT OFFICE.

FINLEY R. PORTER, OF PORT JEFFERSON, NEW YORK, ASSIGNOR TO KNIGHT AMERICAN PATENTS COMPANY, OF CHICAGO, ILLINOIS, A CORPORATION OF DELAWARE.

INTERNAL-COMBUSTION ENGINE.

Application filed October 31, 1916. Serial No. 128,732.

*To all whom it may concern:*

Be it known that I, FINLEY R. PORTER, a citizen of the United States, and resident of Port Jefferson, in the county of Suffolk and State of New York, have invented a new and useful Improvement in Internal-Combustion Engines, of which the following is a specification.

My invention consists in certain improvements in the construction, form and arrangement of the several parts of a four-cycle multiple cylinder internal combustion engine of the horizontally opposed cylinder type.

The engine has two crank shafts and is especially designed for driving two propellers by direct connections therewith. The valves for controlling the admission and discharge of the gases are located between the cylinders, one valve for each pair of cylinders. The valves are so constructed that the supply chamber surrounds the exhaust chamber thus serving to reduce the temperature of the exhaust chamber and to raise the temperature of the supply chamber for ensuring an even temperature for the incoming gases. Each valve is also provided with separate pairs of opposed supply and exhaust ports, thereby obviating the necessity of returning the burnt gases left in the exhaust port, to the cylinder during the succeeding supply stroke.

The opposed pairs of ports also permit the valve to be rotated at a lower speed.

Each of the cylinders has a common supply and exhaust port thus ensuring an equal heat distribution. The outer ends of the cylinders are free to move longitudinally in their crank shaft casings and water jackets under varying heat conditions. This also is a valuable feature of my invention.

A practical embodiment of my invention is represented in the accompanying drawings, in which Fig. 1 is a view of my improved engine representing the same partly in top plan and partly in horizontal section, Fig. 2 is a transverse vertical section taken in the plane of the line II—II of Fig. 1, Fig. 3 is a longitudinal vertical section taken in the plane of the line III—III of Fig. 1, Fig. 4 is a transverse section on an enlarged scale, taken in the plane of the line IV—IV of Fig. 3, Fig. 5 is a detail sectional view showing the different parts at the outer end of one of the cylinders, Fig. 6 is a detail section showing a portion of one of the rotary valves and the parts at the inner end of one of the cylinders, Fig. 7 is a detail section through one of the rotary valves taken at right angles to the section shown in Fig. 6, Fig. 8 is a horizontal section taken in the plane of the line VIII—VIII of Fig. 7, and Fig. 9 is a diagram showing the relative positions of the valve ports and pistons.

I have chosen, for illustrating my invention, a four-cycle eight-cylinder internal combustion engine, in which the cylinders are arranged in horizontally opposed pairs, a vertically disposed rotary valve and its casing being interposed between the inner ends of each pair of horizontally opposed cylinders and a pair of crank shafts and their casings being located at the outer ends of their respective cylinders.

The vertically arranged hollow rotary valve for each pair of horizontally opposed cylinders has an axially arranged downwardly extending tubular portion 1, an upwardly extended axially arranged tubular portion 2 and an intermediate tubular tapered portion 3, which intermediate portion is divided into a supply chamber 4 and an exhaust chamber 5.

The supply chamber 4 communicates with the downwardly extended tubular portion 1 and has diametrically opposed cylinder supply ports 6 and 7 opening through the face of the valve.

The exhaust chamber 5 communicates with the upwardly extended tubular portion 2 and has diametrically opposed exhaust ports 8 and 9 opening through the face of the valve. The valve being tapered and being smaller at the bottom than at the top, and the fuel supply for the cylinders being drawn in through the bottom of the valve, and the exhaust gases being discharged through the top of the valve, cause the valve to be maintained or forced against its seat during the suction and exhaust phases of the engine cycle. During the suction stroke the valve is sucked or forced on its seat, and during the exhaust stroke the reaction of the exhaust gases discharging into atmosphere have the same effect.

The gas may be supplied to the four rotary tubular valves from a carbureter, not shown, through the manifold pipe 10, the branches of which are in open communication with their respective tubular portions 1. The upwardly extended tubular portions 2 of the valves lead to external atmosphere.

Water jacketed casings are provided for the valves, which casings are herein shown as arranged in pairs. Each of these casings has a water jacketed tapered seat 11 provided with a suitable lining 12 for receiving the tapered portion of the valve, the said casing being provided, at diametrically opposite points, with a pair of combined cylinder supply and exhaust ports 13, 14, at all times in open communication with the interior of a pair of horizontally opposed cylinders 15, 16, the inner ends of which cylinders are rigidly secured to the valve casing, as, for instance, by bolts 17. The inner heads for these cylinders 15, 16, are formed in the valve casing itself and are water jacketed.

Each pair of valve casings is provided with removable water jacketed heads 18 formed integral for convenience, which heads surround the upwardly extended tubular portions 2 of the rotary valve.

Water jackets 19, 20, surround the cylinders 15, 16, and are rigidly secured at their inner ends to the valve casing, as, for instance, by bolts 21.

A pair of horizontally disposed crank shafts 22, 23, and their crank casings 24, 25, are located along the outer ends of the pairs of horizontally opposed cylinders 15, 16, which crank shafts are connected by rods 26, 27, to their respective pistons 28, 29, working in the cylinders 15, 16. The outer ends of these cylinders are open to the interiors of the crank shaft casing 24, 25, and are free to move longitudinally in said casings to allow for the extension and contraction of the said cylinders due to variations in temperature.

The outer ends of the water jackets 19, 20, are secured to their respective crank shaft casings 24, 25, for instance by bolts 30.

The outer end of each cylinder is free to move longitudinally in the outer end of the water jacket and a water-tight packing ring 31 is provided for the joint between the cylinder and its water jacket, means 32 being employed for tightening the packing ring to the desired degree.

An intermediate casing 33 is rigidly secured to the crank shaft casing 24, 25, as, for instance, by bolts 34. This intermediate casing 33 serves as a vertical support for all of the rotary valves and valve casings. The bottoms of the valve casings are rigidly mounted on the intermediate casing 33 and secured thereto, as, for instance, by bolts 35.

The means for driving the several rotary valves is as follows: A sectional cross shaft 36, 37, 38, is mounted at its outer ends in suitable antifriction bearings 39, 40, in the crank shaft casings 24, 25, and has geared connections 41, 42, and 43, 44, with the crank shafts 22 and 23 respectively, within the crank shafts casings 24 and 25. The intermediate section of the cross shaft is mounted in suitable antifriction bearings in a casing 45 carried by the intermediate frame 33. This intermediate section 38 of the cross shaft drives a longitudinally arranged horizontal shaft 46 in the present instance through a spiral geared connection 47, 48, which shaft 46 is mounted in suitable bearings in the intermediate casing 33. At each valve, this shaft 46 has a driving connection with the valve, in the present instance by providing the shaft with a spiral gear 49 which meshes with a spiral gear 50 fixed to the downwardly extended tubular portion 1 of the valve.

An oil-tight housing 51 is provided for each of these sets of gears 49, 50, the top of which housing is closed by the valve casing and the bottom wall of which housing serves as a means for securing the branch of the supply manifold pipe 10 in alinement with the downwardly extended tubular portion 1 of the valve.

The magneto 52 and the rotary water pump 53 are driven from the spiral gear 48 through the spiral gear 54 and shaft 55, which shaft is mounted in suitable antifriction bearings in the casing 45. The water is supplied from the pump 53 to the interior of the water jacketed valve casings through suitable pipes and passages 56 and is led from the water jacketed valve casing through the openings 57, it being understood that the cooling spaces around the cylinders are in open communication with the cooling spaces of the valve casings.

Each of the rotary valves has a separate oil supply for lubricating the same in its seat, the oil inlet pipe being denoted by 58, and its outlet pipe by 59. An oil supply passage 60 leads upwardly from the pipe 58 to a vertical passage 61 in the valve casing, which passage 61 opens into a circumferential passage 62 in the casing. A vertical passage 63 leads downwardly from the circumferential passage 62 to the interior of the housing 51. Ports 64, 65, lead from the circumferential passage 62 to oppositely arranged horizontal passages 66, 67, in the inner face of the lining 12. The face of the valve has one or more vertical grooves 68 (two in the present instance), which are alternately brought into communication with the horizontal passages 66, 67, and the combined supply and exhaust cylinder ports as the valve is rotated. The oil is circulated by any suitable circulating pump (not shown) in communication with the inlet and outlet pipes 58 and 59.

It is evident that slight changes may be resorted to in the form, construction and arrangement of the several parts without departing from the spirit and scope of my invention; hence I do not wish to limit myself strictly to the structure herein set forth, but

What I claim is:

1. In a four-cycle multiple cylinder internal combustion engine, a pair of horizontally opposed cylinders adapted to function simultaneously, a rotary valve and its casing located between the inner ends of said cylinders, a pair of crank shafts and their casings located at the outer ends of said cylinders and pistons working in said cylinders, connected to their crank shafts through the outer ends of said cylinders.

2. In a four-cycle multiple cylinder internal combustion engine, a pair of horizontally opposed cylinders adapted to function simultaneously, a rotary valve and its casing located between the inner ends of said cylinders, a pair of crank shafts and their casings located at the outer ends of said cylinders, and pistons working in said cylinders, connected to their crank shafts through the outer ends of said cylinders, the rotary valve having separate cylinder supply and exhaust ports and the valve casing having a common supply and exhaust port for each of said cylinders.

3. In a four-cycle multiple cylinder internal combustion engine, a pair of horizontally opposed cylinders adapted to function simultaneously, a rotary valve and its casing located between the inner ends of said cylinders, a pair of crank shafts and their casings located at the outer ends of said cylinders, and pistons working in said cylinders, connected to their crank shafts through the outer ends of said cylinders, the rotary valve having two oppositely arranged cylinder supply ports and two oppositely arranged cylinder exhaust ports and the valve casing having a common supply and exhaust port for each of said cylinders.

4. In a four-cycle multiple cylinder internal combustion engine, a pair of horizontally opposed cylinders adapted to function simultaneously, a rotary valve and its casing located between the inner ends of said cylinders, a pair of crank shafts and their casings located at the outer ends of said cylinders and pistons working in said cylinders, connected to their crank shafts through the outer ends of said cylinders, the rotary valve having two oppositely arranged cylinder supply ports and a common supply chamber opening through the bottom of the valve and also two oppositely arranged cylinder exhaust ports and a common exhaust chamber opening through the top of the valve, the valve casing having a common supply and exhaust port for each of its cylinders.

5. In a multiple cylinder internal combustion engine, a pair of horizontally opposed cylinders adapted to function simultaneously, a rotary valve and its casing located between the inner ends of said cylinders, said rotary valve being of smaller diameter at the bottom than at the top, a pair of crank shafts and their casings located at the outer ends of said cylinders and pistons working in said cylinders connected to their crank shafts through the outer ends of said cylinders, the rotary valve having two oppositely arranged cylinder supply ports and a common supply chamber opening through the bottom of the valve and also two oppositely arranged cylinder exhaust ports and a common exhaust chamber opening through the top of the valve, the valve casing having a common supply and exhaust port for each of its cylinders.

6. In a four-cycle multiple cylinder internal combustion engine, a plurality of pairs of horizontally opposed cylinders the cylinders of each pair being adapted to function simultaneously, a rotary valve and its casing located between the inner ends of each pair of cylinders, a pair of crank shafts and their casing located at the outer ends of said cylinders and pistons working in said cylinders connected to their crank shafts through the outer ends of said cylinders, each of the rotary valves having separate cylinder supply and exhaust ports and each valve casing having a common supply and exhaust port for each of its cylinders.

7. In a four-cycle multiple cylinder internal combustion engine, a plurality of pairs of horizontally opposed cylinders, the cylinders of each pair being adapted to function simultaneously, a rotary valve and its casing located between the inner ends of each pair of cylinders, a pair of crank shafts and their casing located at the outer ends of said cylinders and pistons working in said cylinders connected to their crank shafts through the outer ends of said cylinders, each of the rotary valves having two oppositely arranged cylinder supply ports and two oppositely arranged cylinder exhaust ports, each valve casing having a common supply and exhaust port for each of its cylinders.

8. In a four-cycle multiple cylinder internal combustion engine, a plurality of pairs of horizontally opposed cylinders, the cylinders of each pair being adapted to function simultaneously, a rotary valve and its casing located between the inner ends of each pair of cylinders, a pair of crank shafts and their casing located at the outer ends of said cylinders and pistons working in said cylinders connected to their crank shafts through the outer ends of said cylinders, said crank shaft being operatively connected with said rotary valve, each of the rotary valves having two oppositely arranged cylinder supply ports and a common supply chamber opening through the bottom of the valve and also two oppositely arranged cylinder exhaust ports and a common exhaust chamber opening through the top of the valve, each valve casing having a common supply and exhaust port for each of its cylinders.

9. In a four-cycle multiple cylinder internal combustion engine, a pair of crank shafts and their casings, a rotary valve and its casing, and a pair of horizontally opposed cylinders having their inner ends fixedly secured to the valve casing and their outer ends free to move longitudinally in their respective crank shaft casings, said crankshafts being operatively connected with said valves.

10. In a four-cycle multiple cylinder internal combustion engine, a pair of crank shafts and their casings, four rotary valves and their casings and four pairs of horizontally opposed cylinders having their inner ends fixedly secured to their respective valve casings and their outer ends free to move longitudinally in their respective crank shaft casings, said crankshafts being operatively connected with said valves.

11. In a four-cycle multiple cylinder internal combustion engine, a pair of crank shafts and their casings, a rotary valve and its casings, a pair of horizontally opposed cylinders, their water jackets fixedly secured at their inner ends to the valve casings and at their outer ends to their respective crank shaft casings, the cylinders having their inner ends fixedly secured to the valve casing and their outer ends free to move longitudinally in the outer ends of their water jackets.

12. In a four-cycle multiple cylinder internal combustion engine, a pair of crank shafts and their casings, a rotary valve and its casing, a pair of horizontally opposed cylinders, their water jackets fixedly secured at their inner ends to the valve casings and at their outer ends to their respective crank shaft casings, the cylinders having their inner ends fixedly secured to the valve casings and their outer ends free to move longitudinally in the outer ends of their water jackets, and water-tight packing rings for the joints between the cylinders and their water jackets.

13. In a four-cycle multiple cylinder internal combustion engine, an intermediate casing, a valve casing and a pair of crank shaft casings carried by and secured to the intermediate casing and a pair of horizontally opposed cylinders fixedly secured at their inner ends to the valve casing and free to move longitudinally at their outer ends in the crank shaft casings.

14. In a four-cycle multiple cylinder internal combustion engine, an intermediate casing, four valve casings and a pair of crank shaft casings carried by and secured to the intermediate casing and four pairs of horizontally opposed cylinders, fixedly secured at their inner ends to their respective valve casings and having their outer ends movable longitudinally in their respective crank shaft casings.

15. In a four-cycle multiple cylinder internal combustion engine, an intermediate casing, a valve casing and a pair of crank shaft casings carried by and secured to the intermediate casing and a pair of horizontally opposed cylinders fixedly secured at their inner ends to the valve casing and free to move longitudinally at their outer ends in the crank shaft casings, and water jackets for the cylinders fixedly secured at their inner ends to the valve casing and at their outer ends to the crank shaft casing and water-tight packing rings for the joints between the water jackets and the outer ends of said cylinders.

16. In a four-cycle multiple cylinder internal combustion engine, an intermediate casing, four valve casings and a pair of crank shaft casings carried by and secured to the intermediate casing and four pairs of horizontally opposed cylinders fixedly secured at their inner ends to their respective valve casings and having their outer ends movable longitudinally in their respective crank shaft casings, and water jackets for the cylinders fixedly secured at their inner ends to their respective valve casings and at their outer ends to their respective crank shaft casings and water-tight packing rings for the joints between the water jackets and the outer ends of said cylinders.

17. In a four-cycle multiple cylinder internal combustion engine, a rotary valve, a water jacketed casing therefor, a pair of horizontally opposed cylinders and their water jackets fixedly secured at their inner ends to said valve casing, the outer ends of said cylinders being freely movable in the last mentioned water jackets, and a pair of crank shaft casings located at the outer ends of said cylinders.

18. In a four-cycle multiple cylinder internal combustion engine, a pair of horizontally opposed cylinders adapted to function simultaneously and a hollow downwardly tapered rotary valve located between the inner ends of said cylinders, said valve having a downwardly extended tubular portion open to gas supply, an upwardly extended tubular portion open to external atmosphere and an intermediate tubular portion divided into separate supply and exhaust chambers having respectively cylinder supply and cylinder exhaust ports leading through the face of the valve.

19. In a four-cycle multiple cylinder internal combustion engine, a pair of horizontally opposed cylinders and a hollow rotary valve located between the inner ends of said cylinder, said valve having a downwardly extended tubular portion open to gas supply, an upwardly extended tubular portion open to external atmosphere, an intermediate tubular portion divided into separate supply and exhaust chambers having respectively cylinder supply and cylinder exhaust ports leading through the face of the valve, and a valve casing developed into heads for the inner ends of said cylinders, each head having a combined supply and exhaust port for coaction with the valve supply and exhaust ports.

20. In a four-cycle multiple cylinder internal combustion engine, a pair of horizontally opposed cylinders and a hollow rotary valve located between the inner ends of said cylinders, said valve having a downwardly extended tubular portion open to gas supply, an upwardly extended tubular portion open to external atmosphere, an intermediate tubular portion divided into separate supply and exhaust chambers having respectively cylinder supply and cylinder exhaust ports leading through the face of the valve, and a water jacketed valve casing developed into heads for the inner ends of said cylinders, each head having a combined supply and exhaust port for coaction with the valve supply and exhaust ports.

21. In a four-cycle multiple cylinder internal combustion engine, a pair of horizontally opposed cylinders, a rotary valve located between the inner ends of said cylinders and means for driving said valve, including a horizontally disposed shaft located under said cylinders and having a geared connection with the valve, and an oil-tight housing for said gears.

22. In a four-cycle multiple cylinder internal combustion engine, a pair of horizontally opposed cylinders, a rotary valve and its casing located between the inner ends of said cylinders and means for driving said valve, including a horizontal shaft having a geared connection with said valve, an oil-tight housing for said gears forming a vertical support for the valve and upper and lower anti-friction bearings forming lateral supports for said valve.

23. In an internal combustion engine, the combination of a pair of opposed aligned cylinders, a rotary valve casing located between the inner ends of the cylinders, a rotary valve seated in said casing for controlling the functioning of the engine cylinders, crank shafts located at the outer ends of said cylinders and pistons in said cylinders connected to the crank shafts.

24. In an internal combustion engine, the combination of a plurality of opposed aligned cylinders, a rotary valve casing symmetrically located between the inner ends of the cylinders, a rotary valve seated in said casing for controlling the functioning of the engine cylinders, crank shafts located at the outer ends of said cylinders and operatively connected with said valves and pistons in said cylinders connected to the crank shafts.

In testimony, that I claim the foregoing as my invention, I have signed my name this 17th day of October 1916.

FINLEY R. PORTER.